(12) United States Patent
Agarwal et al.

(10) Patent No.: US 11,556,408 B2
(45) Date of Patent: Jan. 17, 2023

(54) CLASSIFYING ERRORS IN A FAILURE LOG

(71) Applicant: PayPal, Inc., San Jose, CA (US)

(72) Inventors: Anchika Agarwal, Singapore (SG); Pushpinder Singh, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/198,910

(22) Filed: Mar. 11, 2021

(65) Prior Publication Data

US 2021/0318923 A1  Oct. 14, 2021

(30) Foreign Application Priority Data

Apr. 14, 2020  (IN) .............................. 202041016158

(51) Int. Cl.
*G06F 11/07* (2006.01)

(52) U.S. Cl.
CPC ........ *G06F 11/079* (2013.01); *G06F 11/0772* (2013.01); *G06F 11/0784* (2013.01); *G06F 11/0787* (2013.01); *G06F 11/0793* (2013.01)

(58) Field of Classification Search
CPC .............. G06F 11/0772; G06F 11/079; G06F 11/0784; G06F 11/0787; G06F 11/0793
See application file for complete search history.

(56) References Cited

U.S. PATENT DOCUMENTS

| | | | |
|---|---|---|---|
| 5,740,354 A | 4/1998 | Ben-Natan et al. | |
| 7,055,071 B2 | 5/2006 | Austen et al. | |
| 8,069,366 B1 | 11/2011 | Wenzel | |
| 8,713,350 B2 | 4/2014 | Walton et al. | |
| 2019/0179691 A1* | 6/2019 | Xu | G06K 9/6218 |
| 2019/0205197 A1* | 7/2019 | Hartman | G06F 11/0751 |
| 2020/0034224 A1* | 1/2020 | Nagendra | G06F 11/004 |
| 2021/0200740 A1* | 7/2021 | Sterngold | G06F 16/2358 |

* cited by examiner

*Primary Examiner* — Jigar P Patel
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a method that includes accessing, by a failure management program, a failure log that includes a plurality of character strings corresponding to errors that are associated with execution of one or more batch processes. The failure management program may compare a particular character string of the plurality of character strings to a set of character strings that are associated with respective ones of a plurality of failure categories. This comparing may include determining whether particular keywords that are included in respective ones of the set of character strings are included in the particular character string. In response to the comparing, the failure management program may assign a particular error corresponding to the particular character string to a particular failure category, or may determine a new failure category if the particular character string does not match an existing failure category.

20 Claims, 9 Drawing Sheets

Computer System 100

Failure log 110

| entry 320 | character string 322 | domain 340 | database 342 | job type 344 |
|---|---|---|---|---|
| 320a | "Error 123: 'John1000' not a valid username" | 340a | -- | 344a |
| 320b | "Disk error 35: insufficient disk space" | 340a | 342a | 344b |
| 320c | "Login Error, 'SteveS' is an invalid user ID" | 340a | -- | 344a |
| 320d | "Error 123: 'SuzieSue' not a valid username" | 340a | -- | 344a |
| 320e | "Login Error, 'Dave2000' is an invalid user ID" | 340b | -- | 344a |
| 320f | "Access Error: password expired" | 340b | -- | 344a |
| 320g | "Error 246: disk full" | 340b | 342b | 344b |
| 320h | "Login Error, 'Smith77' is an invalid user ID" | 340b | -- | 344a |

Character analysis 370

| entry 320 | string vectors 360 | correlation values 365 |
|---|---|---|
| 320a | "Error" ; "123" ; "not" ; "valid" ; "username" | 365a |
| 320b | "disk" ; "error" ; "disk" | 365b |
| 320c | "Login" ; "Error" ; "invalid" "user" "ID" | 365c |
| 320d | "Error" ; "123" ; "not" ; "valid" ; "username" | 365d |
| 320e | "Login" ; "Error" ; "invalid" "user" "ID" | 365e |
| 320f | "Error" | 365f |
| 320g | "Error" ; "disk" | 365g |
| 320h | "Login" ; "Error" ; "invalid" "user" "ID" | 365h |

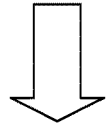

keyword cluster 380

"123" ; "not" ; "valid" ; "username" ; "Login" ; "invalid" ; "user" ; "ID"

*FIG. 3*

| Failure log 110 |||||
|---|---|---|---|---|
| entry 320 | character string 322 | domain 340 | database 342 | job type 344 |
| 320a | "Error 123: 'John1000' not a valid username" | 340a | -- | 344a |
| 320b | "Disk error 35: insufficient disk space" | 340a | 342a | 344b |
| 320c | "Login Error, 'SteveS' is an invalid user ID" | 340a | -- | 344a |
| 320d | "Error 123: 'SuzieSue' not a valid username" | 340a | -- | 344a |
| 320e | "Login Error, 'Dave2000' is an invalid user ID" | 340b | -- | 344a |
| 320f | "Access Error: password expired" | 340b | -- | 344a |
| 320g | "Error 246: disk full" | 340b | 342b | 344b |
| 320h | "Login Error, 'Smith77' is an invalid user ID" | 340b | -- | 344a |

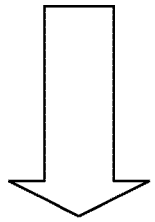

| Failure category 430 ||
|---|---|
| character string 433 | "123" ; "not" ; "valid" ; "username" ; "Login" ; "invalid" "user" "ID" |
| remediation action 426 | - select new username<br>- repeat login with new username |

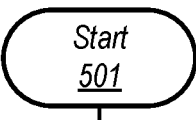

Start
501

Accessing, by a failure management program executing on a computer system, a failure log that includes a plurality of character strings corresponding to errors that are associated with execution of one or more batch processes.
510

Comparing, by the failure management program, a particular character string of the plurality of character strings to a set of character strings that are associated with respective ones of a plurality of failure categories, wherein the comparing includes determining whether particular keywords that are included in respective ones of the set of character strings are included in the particular character string.
520

Assigning, by the failure management program based on the comparing, a particular event corresponding to the particular character string to a particular failure category of the plurality of failure categories.
530

Determining, by the failure management program, a remediation action corresponding to the particular error, wherein the remediation action is determined based on analyzing one or more errors associated with the particular failure category.
540

Applying, by the failure management program, the remediation action to the particular error.
550

End
590

Start
_701_

↓

Accessing, by a failure management program executing on a computer system, a failure log that includes a plurality of character strings corresponding to errors that are associated with execution of one or more batch processes.
_710_

↓

Comparing, by the failure management program, a particular character string of the plurality of character strings to a set of character strings that are associated with respective ones of a plurality of failure categories, wherein the comparison includes determining whether particular keywords that are included in respective ones of the set of character strings are included in the particular character string.
_720_

↓

In response to the particular character string not corresponding to any of the set of character strings, performing, by the failure management program, a similarity analysis of the particular character string to one or more ungrouped character strings, wherein the ungrouped character strings do not correspond to any of the set of character strings, and wherein the similarity analysis includes determining frequencies of occurrence for a plurality of keywords.
_730_

↓

Adding, by the failure management program, a new failure category to the plurality of failure categories, wherein the new failure category includes a particular error corresponding to the particular character string.
_740_

↓

End
_790_

*FIG. 7*

CLASSIFYING ERRORS IN A FAILURE LOG

RELATED APPLICATIONS

The present application claims priority under 35 U.S.C. § 119 to Indian patent application IN 202041016158, filed Apr. 14, 2020, the disclosure of which is incorporated by reference herein in its entirety.

BACKGROUND

Technical Field

This disclosure relates generally to computer system operation, and more particularly to classifying and resolving batch execution failures within a computer system.

Description of the Related Art

A business, government agency, school system, or any other form of large, multi-user entity may rely on an enterprise computing system to provide a computing infrastructure for a plurality of users. An enterprise computing system typically includes one or more server computers to provide computing power and one or more databases to provide network accessible information storage for these users. One or more system administrators, or admins for short, may be responsible for maintaining the enterprise computer system. As part of maintenance, one or more batch processes may be scheduled to perform a series of jobs as resources are available, with each job including one or more tasks. For example, a batch process may comb through databases in the computer system to identify particular types of data, such as sensitive data that should be stored in compliance with a set of security rules. In another example, a batch process may analyze files stored on one or more storage devices to identify redundancies that may be eliminated to increase storage capacity. An example job may include accessing files in one particular database or on one particular storage device. Tasks associated with such jobs may include, for example, performing a login operation to a particular database, reading a particular directory in the particular database, and the like.

During an execution of a batch file, an error may occur. For example, as part of a login task, the login credentials may be wrong due to another user or admin changing a username or a password expiring. An access error may occur if a path to directory to be analyzed has changed. Each occurrence of an error may be captured in a failure log. In some cases, a single issue may cause a plurality of jobs to generate errors, thereby creating a plurality of errors to be captured in the failure log. In a large enterprise computer system, a large number of errors may be captured in a failure log within a short period of time. In some cases, many thousands of errors may be captured within a day or even an hour.

BRIEF DESCRIPTION OF THE DRAWINGS

FIG. 3 includes two tables depicting, respectively, a failure log and a character analysis of logged failures.

FIG. 4 includes two tables illustrating, development of a remediation action from an analysis of logged failures in a failure log.

FIG. 5 shows a flow diagram of an embodiment of a method for classifying an entry in a failure log.

FIG. 7 illustrates a flow diagram of an embodiment of a method for creating a new failure category using uncategorized entries.

DETAILED DESCRIPTION

Figure 1:
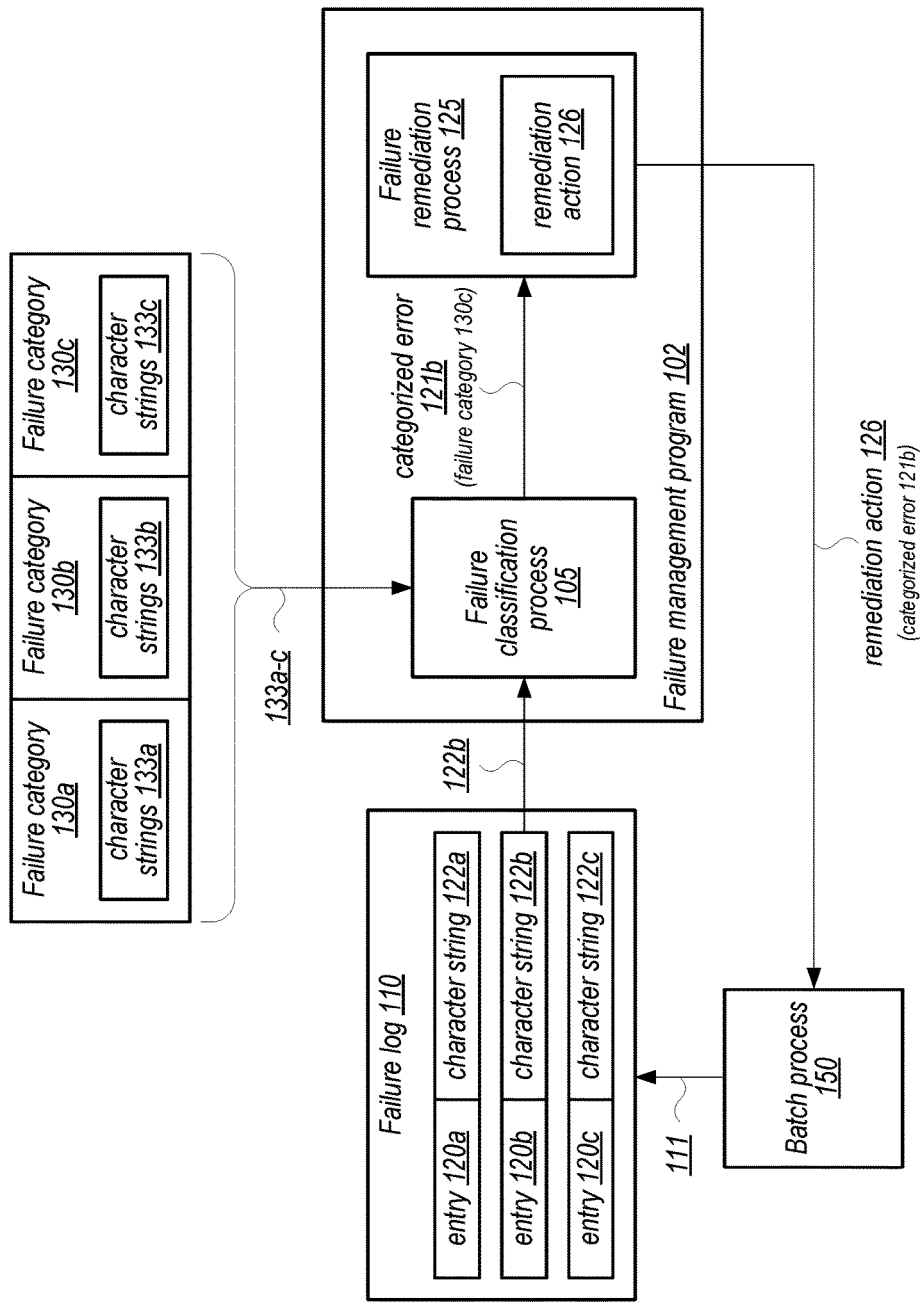
FIG. 1 illustrates a block diagram of an embodiment of a failure categorization process being performed by a computing system.

In an enterprise computer system, execution of batch processes may generate errors that are then captured in one or more failure logs, each logged error corresponding to an event that causes the error. As used herein, an "event" refers to an occurrence that results in one or more errors and/or other notifications being generated. An "error" refers, herein, to a failure of a job or task to complete successfully. A "notification" refers to a message received as a result of performing a job or task, but that does not prevent the job or task from completing successfully. Errors and notifications may be captured in a respective entry in a failure log. Each event has a cause, e.g., an expired password may cause one or more login errors, a change in the path to the directory where the file is stored may cause a "file not found" error, etc. In some cases, one particular cause may be responsible for a plurality of errors. If a name of a high-level directory is changed, then the path to all files within that directory and any subdirectories will be changed. If multiple tasks are used for each subdirectory, then one entry may be generated in the failure log for each subdirectory beneath the high-level directory. In an enterprise computer system, a number of errors that may occur from execution of a single batch file may be quite large. Multiple batch files executing across multiple domains and databases may generate a number of logged errors and notifications for an admin or even a team of admins to handle.

The inventors have recognized a benefit to having an automated process for reviewing, classifying, and resolving errors logged into one or more failure logs. By automating management of failure logs, admins may have spare bandwidth for other activities, such as system maintenance, preventative care of the computer system, and system enhancements.

Techniques are disclosed herein for accessing a failure log that includes a plurality of logged entries that are associated with execution of one or more batch processes. A process such as a failure classification process may compare a character string associated with a particular logged entry to a set of character strings that are associated with respective failure categories. Based on the comparing, the process may assign the particular logged entry to a particular one of the failure categories. A process such as a failure remediation process may then determine, based on analyzing one or more errors associated with the particular failure category, a remediation action corresponding to the particular logged entry, and then apply the remediation action to the particular entry. If the particular logged entry cannot be associated with an existing failure category, then the failure classification process may perform a similarity analysis of the character string of the particular logged entry to one or more ungrouped character strings that do not correspond to any of the set of character strings. Based on the similarity analysis, the failure classification process may add a new failure category to the plurality of failure categories, where the new failure category includes the particular logged entry.

A block diagram of an embodiment of a computing system is illustrated in FIG. 1. As shown, computer system 100 may correspond to a server computer system, personal computer system, desktop computer, laptop or notebook computer, mainframe computer system, server computer system operating in a datacenter facility, tablet computer, handheld computer, workstation, network computer, etc. Computer system 100 includes batch process 150 that may generate entries 120a-120c (collectively 120) with respective character strings 122a-122c (collectively 122). Computer system 100 also includes failure management program 102 that further includes failure classification process 105 and failure remediation process 125. Failure classification process 105 accesses failure log 110 and failure categories 130a-130c (collectively 130), while remediation process 125 may activate batch process 150, or a portion thereof.

As illustrated, failure management program 102, executing on computer system 100, calls failure classification process 105 which accesses failure log 110. Failure log 110 includes a plurality of character strings 122 corresponding to entries 120 that are associated with execution of one or more batch processes, such as batch process 150. Batch process 150 includes a plurality of jobs to be performed by computer system 100. The jobs may be performed within computer system 100, or may be performed by computer system 100 on one or more other computer systems that are communicatively coupled to computer system 100. Each job corresponds to any type of computer-performed task or set of tasks that may executed on a computer system. For example, some jobs may include scanning a particular database for computer viruses or for security rule compliance. A particular job may be configured to scan an entire database, files associated with one user's account on the database, a particular type of data, or any other suitable level of detail. When an error occurs, batch process 150 receives an associated error message and, in transaction 111, creates a new entry in failure log 110. The new entry is assigned an identification as an entry 120 and stores the error message as an associated character string 122. Entry 120 may include any suitable information to link the entry to a particular job and/or task within batch process 150.

It is noted that entries 120 that are generated in failure log 110 may not always correspond to errors. In some cases, performance of a job may result in a notification even when the job is performed successfully. For example, a login job may result in a notification that a passcode used in the login job will expire in the next two weeks. Such a notification may, in some embodiments, be treated as an error by generating an entry 120 in failure log 110. In such embodiments, use of the term error can include references to notifications.

Failure classification process 105, as shown, analyzes entries 120 in order to classify each of entries 120a-120c into one of failure categories 130. Failure categories 130 may correspond to any suitable classification of a logged failure associated with batch process 150. For example, a batch process that is configured to scan a database for security compliance of data objects associated with a particular user account may generate errors such as invalid login credentials for accessing the data objects, particular data objects not found, invalid command, disk read errors, disk write errors, and the like. Failure classifications may be established by a system administrator or may be generated by failure classification process 105 using keywords included in character strings 122.

To select a particular one of failure categories 130, failure classification process 105 compares a particular character string (e.g., character string 122b) of the plurality of character strings 122 to a set of character strings 133a-133c (collectively 133) that are associated with respective ones of failure categories 130. In some embodiments, failure classification process 105 compares each of character strings 122, one at a time, to the set of character strings 133 to identify similarities that are indicative of the corresponding entry 120 being associated with a respective one of failure categories 130. Failure classification process 105, in various embodiments, may analyze failure log 110 in response to an indication that a new entry 120 has been added, or in response to an indication that batch process 150 has completed, or in response to other similar actions.

The comparing includes determining whether particular keywords that are included in respective ones of character strings 133 are included in character string 122b. In addition, the comparing may further include determining a frequency of usage of the particular keywords in character string 122b. For example, character string 122b may include one use of the term "database," while one of character strings 133 (e.g., character string 133a) may include three uses of the term. In some embodiments, failure classification process 105 may not associate character string 122b with character string 133a due to the difference in the frequency of usage of the term "database."

Based on the comparing, failure classification process 105 assigns entry 120b, corresponding to character string 122b, to failure category 130c of the plurality of failure categories 130. In response to identifying similar keyword usage between character string 122b and character string 133c, failure classification process 105 determines that entry 120b belongs to failure category 130c. In addition to keyword usage, failure classification process may identify other similarities between character string 122b and character string 133c, such as a common database being accessed, and/or common types of jobs being performed. After an entry 120 is associated with a particular one of failure categories 130, the entry 120 may be considered an error. Although referred to as errors after an assignment, in some embodiments, one or more failure categories 130 may be utilized to classify entries that are not associated with an actual error, such as a notification of a soon to expire password. Additional details regarding the comparison of character strings in a failure log and character strings 133 associated with failure categories is disclosed below in regards to FIG. 3.

In response to assigning entry 120b to failure category 130c, failure classification process 105 sends entry 120b (now identified as categorized error 121b) to failure remediation process 125. In some embodiments, failure classification process 105 generates categorized error 121b as an output to a different process in failure management program 102, and this different process, e.g., a main process or a scheduling process, calls failure remediation process 125, including categorized error 121b in the call. As illustrated, failure remediation process 125 determines that remediation action 126 corresponds to categorized error 121b by analyzing one or more errors associated with failure category 130c. In some embodiments, determining a remediation action may include determining, at a first point in time, that no remediation action has been defined for failure category 130c. Failure remediation process 125 waits for a remediation action to be defined, and, at a second point in time, determines that remediation action 126 has been defined for failure category 130c. For example, at the first time, remediation action 126 has not been created and/or configured for use by failure remediation process 125 due to a lack of a sufficient number of categorized errors 121 having been assigned to failure category 130c. The addition of categorized error 121b may provide a sufficient number of errors assigned to failure category 130c to allow remediation process 125, a different process running on computer system 100, or a system administrator, or a combination thereof, to identify one or more actions that may overcome, mitigate, work around, or otherwise address a failure mechanism that resulted in a plurality of categorized errors 121 assigned to failure category 130c from occurring.

Once remediation action 126 is available for use, failure remediation process 125 applies remediation action 126 to categorized error 121b. As shown, applying remediation action 126 to categorized error 121b includes creating, by failure remediation process 125, one or more child processes to perform tasks associated with remediation action 126. For example, if errors in failure category 130c are related to a disk full error in a particular database, then remediation action 126 may be to perform a compaction operation on the database to remove obsolete and/or redundant data objects, thereby freeing space in the database to allow one or more tasks included in batch process 150 corresponding to categorized error 121b to be re-executed. In the case of a particular failure category 130 that is associated with entries 120 that are not actual errors, the remediation action may be to ignore the entries assigned to the particular failure category 130.

In response to determining that remediation action 126 has completed, failure remediation process updating may update a respective state of categorized error 121b. Each entry 120 may include a state value that indicates where in the remediation process that a particular entry 120 currently resides. For example, possible states for an entry may include "open," "in progress," "ignore," "resolved," and "invalid." "Open" may be a first state that a particular entry is assigned. The particular entry remains in the open state until it is assigned to a failure category 130. "In progress" is assigned to entries that have been assigned, but for which no remediation action has been performed. An entry may be placed in the "ignore" state if a failure mechanism associated with the failure category 130 cannot be remedied within a particular amount of time and no other remediation action is available. For example, a particular failure category may be associated with a storage device that has been taken offline due to a malfunction. Entries 120 associated with jobs that are directed to this storage device may be ignored until the storage device is replaced or repaired. Once a remediation action has been successfully performed for a given entry, the given entry is updated to the "resolved" state. In some cases, an entry may be created in response to a message that is not related to a failure. For example, a login task may receive a notification that a password used will expire at a future point in time (e.g., "Password will expire in 7 days."). For a current performance of batch process 150, such a notification is not related to an actual error, although a new entry may be logged into failure log 110 due to receiving the message. Accordingly, such an entry is given a state of "invalid" and may be ignored.

Implementation of failure management program 102 in a computer system may help to reduce workloads for a system administrator or team of system administrators. By classifying errors and then implementing a respective remediation action to address the error, consumption of a system administrator's bandwidth may be avoided, allowing the system administrator to work on other activities. Additionally, performing the classifying and remediation processes by the computer system may result in a reduction in time to achieve a successful execution of batch process 150, which, in turn, may increase an available bandwidth of computer system 100.

It is noted that the embodiment of FIG. 1 is merely an example for demonstration of disclosed concepts. In other embodiments, the illustrated computing system may include a different combination of elements, and/or a different distribution of tasks between elements. For example, failure classification process 105 and failure remediation process 125 are each described as performing particular tasks. In other embodiments, the described tasks assigned to these processes may be different, such as a single process performing all of the described tasks. Other embodiments may include additional processes. For example, failure remediation process 125 is described as assigning states to entries 120. In other embodiments, a different process may be included that maintains state information for each entry 120 in failure log 110.

Figure 2:
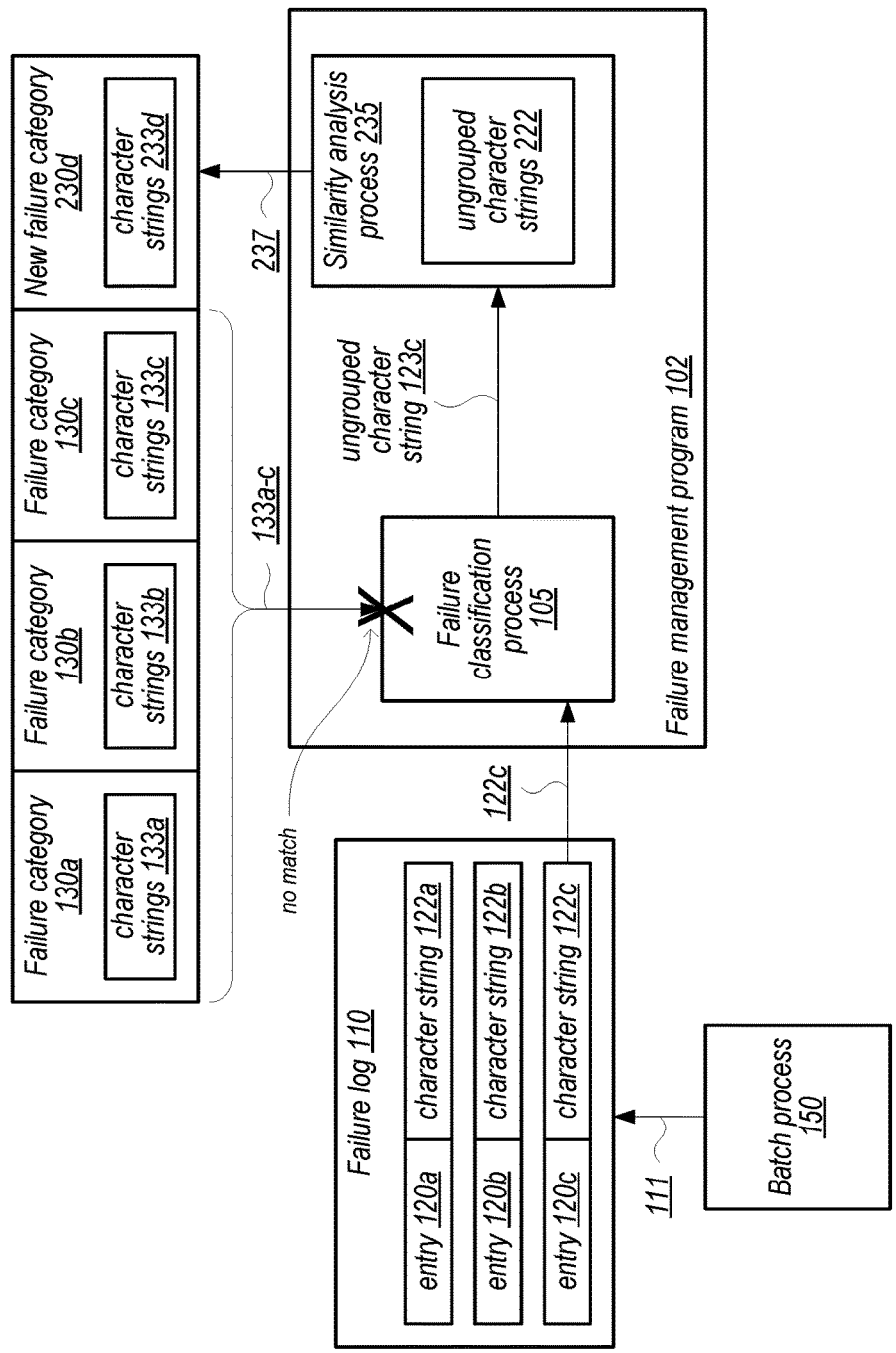
FIG. 2 shows a block diagram of another embodiment of a failure categorization process being performed by a computing system.

The enterprise computing system of FIG. 1 illustrates how a computing system may classify a log entry and determine a remediation action for an error identified by the entry. In some cases, a failure category may not exist for a given entry. In FIG. 2, an example of a technique for identifying uncategorized entries and determining a new failure category for a subset of the uncategorized entries is shown.

Moving to FIG. 2, a block diagram of another embodiment of computer system 100 is shown, in which a log entry is not matched to an existing failure category. Computer system 100 includes failure log 110, batch process 150, failure categories 130, and failure management program 102 as previously shown in FIG. 1. Failure management program 102 includes failure classification process 105, as before, and further includes similarity analysis process 235. As illustrated, similarity analysis process 235 is used to add new failure category 230d in response to identifying an unmatched log entry.

As illustrated, failure management program 102, executing on computer system 100, accesses failure log 110 that includes a plurality of character strings 122 corresponding to entries 120 that are associated with execution of batch process 150. In various embodiments, batch process may be performed by computer system 100 or by a different computer system. As batch process 150 is performed, errors or other issues may occur that are then captured as entries 120 in failure log 110. A given entry 120 includes a respective character string 122 that is indicative of the nature of the given entry 120, including, for example, an error code, an error message, a time indicative of when the error occurred, a job and/or task that was being performed when the error occurred, and the like. As shown, failure management program 102 uses failure classification process 105 to access failure log 110. In other embodiments, however, other processes included in failure management program 102 may be used for accessing failure log 110.

Failure management program 102 uses failure classification process 105 to compare a particular character string (e.g., character string 122c) of the plurality of character strings 122 to a set of character strings 133 that are associated with respective ones of a plurality of failure categories 130. As shown, failure classification process 105 attempts to match entry 120c to one of failure categories 130 based on character strings 133. The comparing includes determining whether particular keywords that are included in respective ones of character strings 133 are included in character string 122c. The comparison may also include determining a frequency of usage of the particular keywords in character string 122c, and comparing the frequency to the frequency of usage of similar keywords in character strings 133.

In response to character string 122c not corresponding to any of character strings 133, failure management program 102 performs a similarity analysis of character string 122c to one or more ungrouped character strings 222 that do not correspond to any of character strings 133. The similarity analysis includes determining frequencies of occurrence for a plurality of keywords. After failing to match character string 122c to any of character strings 133, failure classification process 105 sends character string 122c, as ungrouped character string 123c, to similarity analysis process 235. Similarity analysis process 235 tracks one or more ungrouped character strings 222 that failure classification process 105 has also failed to match to any of character strings 133. Similarity analysis process 235 compares keywords identified in ungrouped character string 123c to keywords associated with ones of ungrouped character strings 222. Keywords may be identified using any suitable method, such as identifying words in ungrouped character string 123c and ungrouped character strings 222, that are not common across all strings. For example, the word "error" may appear in many of the character strings, while the word "access" may be found in less than half of the character strings. In this example, "access" may be identified as a keyword while "error" is excluded. In addition, some simpler words, for example, articles "a," "an," and "the," may be excluded from use as keywords.

In some embodiments, keyword frequencies of usage may be used to generate string vectors for each of ungrouped character string 123c and ungrouped character strings 222 that are indicative of keyword usage in a corresponding character string. A technique, such as cosine similarity, may be used to compare string vectors from various character strings and identify two or more of the compared character strings that are similar. If a subset of the compared character strings have adequate similarities, then the subset may be grouped to form new failure category 230d.

As illustrated, failure management program 102 adds, in transaction 237, new failure category 230d to the plurality of failure categories 130. The addition may be performed by similarity analysis process 235 or a different process included in failure management program 102. New failure category 230d may include entry 120c corresponding to ungrouped character string 123c. In addition, relevant keywords that are included in the subset of character strings are identified as character strings 233d and are associated with new failure category 230d. When a next character string 122 from failure log 110 is compared to character strings 133, character string 233d is included in the comparison.

In some embodiments, failure management program 102 generates a notification that new failure category 230d has been added. This notification may be sent to one or more system administrators who may then analyze the errors assigned to new failure category 230d and identify a remediation action for these errors and any errors that are assigned to new failure category 230d in the future.

As previously described, implementation of failure management program 102 in a computer system may help to reduce workloads for one or more system administrators. By identifying new failure categories for errors that are not associated with existing failure categories, computer system 100 may manage execution of one or more batch processes while avoiding consumption of a system administrator's bandwidth, while additionally resulting in a reduction in time to achieve a successful execution of batch process 150.

It is noted that the system of FIG. 2 is merely an example. The number of entries in failure log 110 and the number of failure categories 130 are selected for clarity. In other embodiments, any suitable number of entries and failure categories may be included. Two processes are illustrated as being included in failure management program 102, failure classification process 105 and similarity analysis process 235. In other embodiments, additional process may be included, such as failure remediation process 125 in FIG. 1. Alternately, these various processes could be implemented as a single process.

It is also noted that the techniques described in FIGS. 1 and 2 may be implemented, in part or in whole, as program instructions included a software program, such as failure management program 102. Such a software program may be stored in a non-transitory, computer-readable medium having program instructions stored thereon that are executable by the computing device to cause the operations described with reference to the processes shown in FIGS. 1 and 2.

In the descriptions of FIGS. 1 and 2, a failure log is described for use in capturing errors (including non-error notifications) associated with performance of one or more batch processes. The failure log is described as including a plurality of entries with associated character strings. Furthermore, a character analysis is described in regards to comparing an ungrouped character string to a plurality of other ungrouped character strings. Examples of a failure log and a character analysis are presented below in regards to FIG. 3.

Turning to FIG. 3, two tables are shown, one depicting a failure log, and the other depicting a character analysis. Failure log 110 includes eight entries, entry 320a to entry 320h, that associated with errors that occur during execution of one or more batch processes, such as batch process 150. Five columns are shown for each entry 320. The column for entry 320 includes an identifying value for each entry. Character string 322 includes a string of characters associated with each entry 320. Domain 340 includes an identifier for a particular domain into which a batch process was logged when the associated error occurred. Database 342 identifies a particular database that was being accessed during an associated error. It is noted, that not all errors may be associated with a particular database, resulting in this field not having a valid database identifier for such cases. As shown, only entries 320b and 320g include values for database 342. The last illustrated column is job type 344 that identifies a type of job being performed at a time of the associated error.

As described above, failure classification process 105 compares character string 122b to the set of character strings 133 to determine that entry 120b should be assigned to failure category 130c. As part of this comparison, failure classification process 105 may compare more than just character strings. Failure classification process 105 may include additional information associated with entry 120b, such as respective values for domain 340, database 342, and job type 344, and compare this additional information to similar information associated with errors included in each of the failure categories 130. For example, failure classification process 105 may use the character string comparison to narrow a selection down to two or more of failure categories 130, and then use the additional information associated with errors in the two or more failure categories 130 to narrow the selection down to a single failure category 130.

As an example, failure classification process 105, based on the comparing, may determine that entry 120b is associated with a same database 342 as at least some other errors that correspond to failure category 130c. For example, entry 120b may correspond to entry 320b which corresponds to an access of database 342a. One or more of the errors associated with failure category 130c may also have occurred while accessing database 342a. Failure classification process 105 may determine that entry 120b has a same job type 344 as at least some other errors that correspond to failure category 130c. In a similar manner, failure classification process 105 may determine, based on the comparing, that entry 120b is associated with a same domain 340 as at least some other errors that correspond to failure category 130c. Accordingly, data other than character strings may be captured in failure log 110 and used to select a particular one of failure categories 130 to assign to a given one of entries 320.

As described above in regards to FIG. 2, if a particular one of failure categories 130 is not matched to a given entry 320, then the uncategorized entry 320 is passed to similarity analysis process 235. As illustrated, character analysis 370 corresponds to at least a portion of the analysis that is performed by similarity analysis process 235. Character analysis 370 includes a table with three columns that includes data associated with each of entries 320 in failure log 110. The columns include identifiers for entries 320, a respective set of string vectors 360, and a corresponding correlation value 365.

Similarity analysis process 235 generates string vectors 360 from ungrouped ones of character strings 322 by removing words of character strings 322 that occur at a frequency that is less than a threshold frequency. As disclosed above, string vectors 360 may correspond to keywords that are found in the character strings 322 with a frequency that is high enough to provide matches to other character strings. For example, if entries 320a-320h all correspond to uncategorized entries, then similarity analysis process 235 may identify keywords that occur in more than one character string 322. If a word appears in only one character string 322, then that word may not be useful for matching to other character strings 322. In addition, simple words, such as articles "a," "an," and "the," may be removed to simplify the analysis since such words may not provide suitable distinction between character strings. For example, the words "35," "insufficient," and "space" in the character string 322 for entry 320b only appear in failure log 110 for entry 320b, and are therefore removed from string vector 360 for entry 320b, leaving the words "disk" and "error" as keywords.

As illustrated, similarity analysis process 235 determines correlation values 365 using string vectors 360. A given correlation value 365 indicates a degree of correlation between a corresponding group of string vectors 360. For example, correlation value 365a may include a set of seven values, each value indicating a correlation of the string vector 360 for entry 320a to a respective one of string vectors 360 for the other entries 320b-320h. In such an embodiment, correlation value 365a may indicate a high correlation to entry 320d, a moderate correlation to entries 320c, 320e, and 320h, and a low correlation to entries 320b, 320f, and 320g. Similarly, correlation value 365c may indicate a high correlation to entries 320e and 320h, a moderate correlation to entries 320a and 320d, and a low correlation to entries 320b, 320f, and 320g. Each correlation value may be represented with any suitable set of values. For example, in one embodiment, each correlation value may be a real number between 0 and 1.

Similarity analysis process 235, as shown, creates keyword cluster 380 based on the set of correlation values 365. Using correlation values 365 for entries 320 that indicated high or moderate correlation, (e.g., 365a, 365c, 365d, 365e, and 365h), similarity analysis process 235 generates keyword cluster 380, including the keywords "123," "not," "valid," "username," "Login," "invalid," "user," and "ID." It is noted that the word "error" that appears in all eight string vectors 360 is not included in keyword cluster 380. If a word appears in all or most of character string vectors 360, then that word may be too commonly used, and therefore, not useful for narrowing down a group to a subset of entries 320.

As illustrated, similarity analysis process 235 identifies a new failure category (e.g., new failure category 230d in FIG. 2) by associating a subset of character strings 322 to keyword cluster 380. Once keyword cluster 380 has been generated, similarity analysis process 235 compares each character string 322 to keyword cluster 380 to determine a degree of correlation between keywords in a given character string 322 and the keywords of keyword cluster 380. If a suitable number of character strings 322 have a high correlation to keyword cluster 380, then new failure category 230d is created.

In some embodiments, a numeric vector may be generated for each character string 322. For example, each position in the numeric vector corresponds to a particular one of the keywords in keyword cluster 380. If a given character string 322 includes that keyword, then the corresponding position for that keyword is set to a first value, and otherwise to a second value. In some embodiments, the first value may be the number of times that keyword occurs in the given character string 322. In other embodiments, the first value may simply be '1' regardless of a number of occurrences. These numeric vectors may be compared, for example two at a time, using a cosine similarity algorithm to generate a correlation value. If the correlation value satisfies a particular threshold (e.g., greater than or equal to an 85% correlation) then the two corresponding entries 320 may be linked together as a subset. After all ungrouped entries 320 have been evaluated, any resulting subsets including a sufficient number of entries 320 may be assigned to a respective new failure category.

In some cases, the comparison of a particular character string 322 that is ungrouped to other ungrouped ones of character strings 322 may include comparing additional information included in failure log 110. For example, performing similarity analysis process 235 may include determining that a particular entry 320 is associated with a same data source (e.g., a same value for database 342) as at least some entries 320 corresponding to a subset of ungrouped character strings 322. In addition, performing similarity analysis process 235 may include determining that a particular entry 320 has a same job type 344 as at least some entries in a subset of ungrouped character strings 322. Furthermore, performing similarity analysis process 235 may include determining that a particular entry 320 is associated with a same domain 340 as at least some entries corresponding to a subset of ungrouped character strings 322.

It is noted that the failure log and character analysis depicted in FIG. 3 are merely examples. The depicted logs and analysis have been simplified for clarity. In other embodiments, the failure log and/or the character analysis may include additional or different sets of information for performing the comparisons.

The tables of FIG. 3 depict a case in which a character string for an entry is not matched to an existing failure category, resulting in identifying a new failure category. In FIG. 4, a case is depicted in which a remediation action is generated and utilized for a new failure category.

Turning to FIG. 4, two tables are shown, one depicting a failure log, and the other depicting a failure category with an associated character string and remediation action. As illustrated, failure log 110 is the same as shown in FIG. 3. Failure category 130 may correspond, for example, to any one of failure categories 130a-130c in FIG. 1 or to new failure category 230d in FIG. 2. Failure category 430 includes associated character string 433 and remediation action 426.

Failure log 110 and failure category 430 may be used to demonstrate how a remediation action is determined after a new failure category has been added. Failure category 430, as illustrated, is added using the techniques described in regards to FIG. 3 above. Entries 320a, 320c, 320d, 320e, and 320h are added to failure category 430 based on the previously described techniques. Using keyword cluster 380 and character strings 322, relevant keywords are determined for inclusion in character string 433. For example, keywords from the character strings 322a, 322c, 322d, 322e, and 322h that were matched to keyword cluster 380 may be selected for use in character string 433. When a character string associated with a new entry is captured and compared to existing failure categories, character string 433 is used to determine whether the new entry should be assigned to failure category 430.

When failure category 430 is added, failure management program 102 may generate a notification indicating that new failure category 430 has been added. This notification may be sent to one or more system administrators using any suitable method, such as email, text message, pop-up notice, and the like. A notified system administrator may review the entries 320 assigned to failure category 430, to determine a suitable remediation action 426.

In some embodiments, failure remediation process 125 may, in response to the notification, analyze errors included in new failure category 430 to determine particular keywords that may be indicative of a potential remediation and/or to determine a remediation action. For example, failure remediation process 125 may track a plurality of predetermined remediation actions associated with particular types of failure events. Based on character string 433, failure remediation process 125 may select a particular one of the predetermined remediation actions and assign this action to failure category 430 as remediation action 426. As shown, character string 433 includes the keywords "login," "username," "user," "ID," "valid," and "invalid," all associated with login errors due to an invalid username or user ID. Failure remediation process 125 compares these keywords to character strings associated with remediation actions associated with login errors, and may determine that a predetermined remediation action exists for addressing username and user ID errors. Failure remediation process 125 assigns failure category 430 to the determined remediation action as remediation action 426.

After remediation action 426 is assigned to failure category 430 (either by failure remediation process 125 or by a system administrator), failure remediation process 125 applies remediation action 426 to entries 320 included in new failure category 430. For example, to address an invalid username error in a login type job, a first step may be to select new username. A username may be invalidated if a user associated with the username cancels the account or changes their login credentials. In some cases, a system administrator or team of system administrators may utilize specific login credentials for use with batch processes. These credentials may be changed, for example, periodically for security reasons, or if there is a change to membership of the administration team. Selecting a new username may include prompting a system administrator to select the new username, or may be accomplished by failure remediation process using a predetermined list of valid login credentials. After a new username has been selected, failure remediation process 125 causes batch process 150 (in FIGS. 1 and 2) to repeat, thereby causing batch process 150 to login with the new username.

Remediation action 426 may generate new errors, which are captured as entries 320 in failure log 110, or in a different failure log associated with the repeat of batch process 150. In some cases, remediation action 426 may cause the same entries 320 to repeat. In such cases, failure remediation process 125 may determine that new entries in the new failure log correspond to entries 320 associated with failure category 430. In various embodiments, failure remediation process 125 may repeat the determining of a remediation action by selecting a different action from remediation action 426. In other embodiments, failure remediation process 125 may send a notification indicating a repeated failure.

It is noted that the tables illustrated in FIG. 4 are examples for demonstrating disclosed concepts. The character string and remediation action shown for the failure category have been simplified for clarity and may be different in other embodiments. Additional or different sets of information may be included in these tables in some embodiments.

Failure management programs, as described above, may be operable to perform a variety of methods. FIGS. 5-8, described below, provide examples of such methods.

Proceeding to FIG. 5, a flow diagram illustrating an example method 500 for assigning an entry to a failure category is depicted, according to some embodiments. In various embodiments, method 500 may be performed by computer system 100 of FIGS. 1 and 2 to assign entry 120b in FIG. 1 to failure category 130c. Computer system 100 may, for example, include (or have access to) a non-transitory, computer-readable medium having program instructions stored thereon that are executable by computer system 100 to cause the operations described with reference to FIG. 5. Referring collectively to FIGS. 1 and 5, method 500 begins in block 501.

At block 510, in the illustrated embodiment, method 500 includes accessing, by failure management program 102 executing on computer system 100, failure log 110 that includes a plurality of character strings 122 corresponding to errors that are associated with execution of batch process 150. Batch process 150 may be performed for any suitable reason. For example, batch process 150 may include virus scan software, processes for detecting compliance with security rules, data storage clean-up of old or orphaned files, and the like. While batch process 150 is being performed on computer system 100, one or more errors may occur. A respective character string 122 is captured for each entry 120 and an identifier for an entry 120 and a corresponding character string 122 is stored in failure log 110. Failure management program 102 may use failure classification process 105 to determine whether a given one of entries 120 (e.g., entry 120b) corresponds to one of failure categories 130.

Method 500, at block 520, includes comparing, by failure management program 102, character string 122b of the plurality of character strings 122 to a set of character strings 133 that are associated with respective ones of a plurality of failure categories 130. The comparing includes determining whether particular keywords that are included in respective ones of the set of character strings 133 are included in character string 122b. Failure management program 102 calls failure classification process 105 to read character string 122b from failure log 110 and compare character string 122b to character strings 133. The comparison may include identifying particular keywords within character string 122b by eliminating commonly used words that do not provide much distinction. For example, simple words such as articles, conjunctions, an pronouns may be excluded from the comparison. In some embodiments, correlation values may be generated that indicates how well character string 122b corresponds to each of character strings 133. Such a correlation value may include any suitable range of values, for example, real numbers between zero and one, integers from one to ten, a percentage from 0% to 100%, and the like.

Method 500 further includes, at block 530, assigning, by failure management program 102 based on the comparing, entry 120b corresponding to character string 122b to failure category 130c of the plurality of failure categories 130. In response to determining that character string 122b meets a threshold value for similarity to character string 133c, failure classification process 105 assigns entry 120b to failure category 130c. The assigning may occur by adding a field to the entry for entry 120b in failure log 110 that assigns entry 120b to failure category 130c, or the assigning may occur by adding entry 120b to a different log of assigned errors, a corresponding entry in this different log providing the indication that entry 120b is assigned to failure category 130c.

At block 540, method 500 further includes determining, by failure management program 102, that remediation action 126 corresponds to the error associated with entry 120b. After entry 120b has been assigned to failure category 130, failure management program 102 calls failure remediation process 125 to determine a particular remediation action for failure category 130c, including entry 120b. Failure remediation process 125 determines remediation action 126 corresponds to entry 120b based on analyzing one or more errors associated with failure category 130c. In some cases, a remediation action may have been previously associated with failure category 130c, and failure remediation process 125 uses this remediation action to resolve an error indicated by entry 120b. In other cases, a remediation action may not have been determined for failure category 130c. In such cases, failure remediation process 125 analyses character strings 133c and character strings associated with errors assigned to failure category 130c, including character string 122b, to identify an event that caused the errors to occur and to select, for example, remediation action 126 from a plurality of predetermined remediation actions associated with such events.

Furthermore, method 500 includes, at block 550, applying, by failure management program 102, remediation action 126 to the error associated with entry 120b. After remediation action 126 has been selected for use with entry 120b, failure management program 102 may cause batch process 150 to be repeated, in whole or in part, with actions associated with remediation action 126 replacing corresponding actions associated the previous performance of batch process 150 that resulted in entry 120b occurring. In some cases, remediation action 126 may be to send a notification to one or more system administrators that entry 120b occurred, along with any relevant information that may help the system administrator to determine a cause and/or a remedy for the occurrence of entry 120b. The method ends in block 590. In some embodiments, method 500 is repeated continuously or periodically.

It is noted that the illustrated example of method 500 includes elements 501-590. In other embodiments, additional and/or different operations may be utilized to assign an entry to a failure category. For example, operations of block 550 are described as occurring after a remediation action has been selected. In some embodiments, the remediation action may not be applied until batch process 150 has completed and all entries in the failure log have been reviewed by the failure management program.

The method of FIG. 5 describes selection and application of a remediation action for a failure category. In some cases, a remediation action may not currently be available for a failure category. A method is illustrated in FIG. 6 for handling cases in which a remediation action is not currently available.

Figure 6:
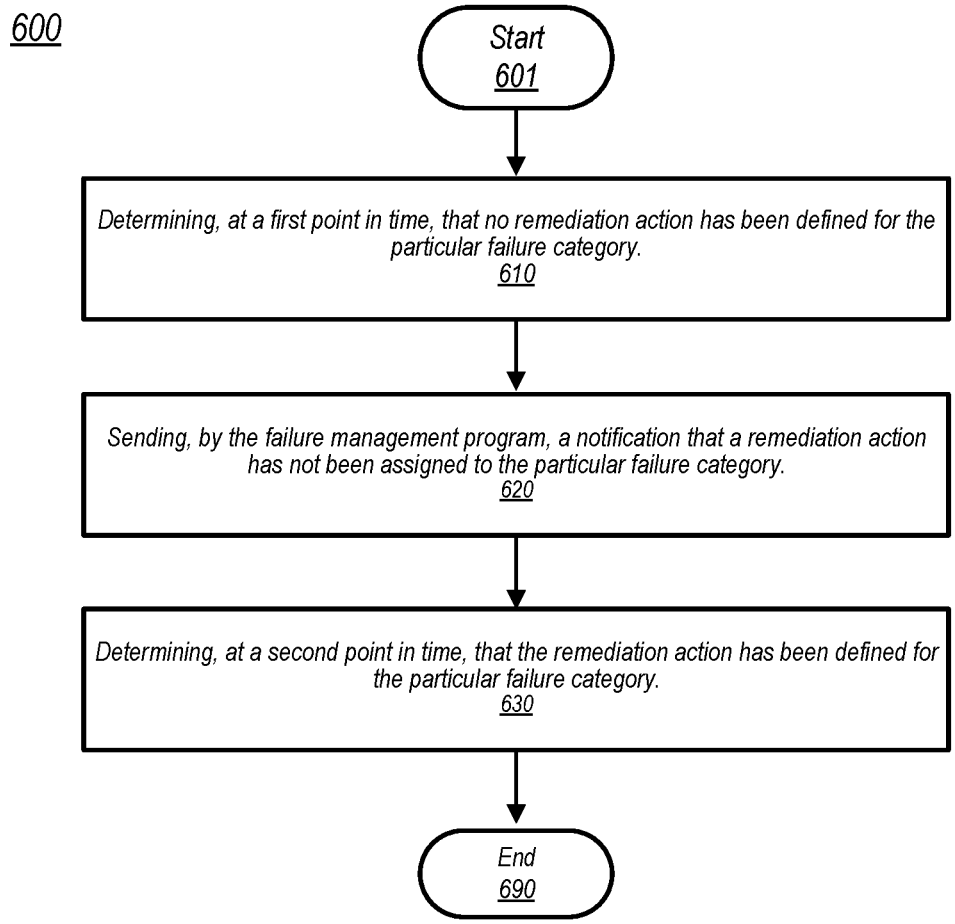
FIG. 6 depicts a flow diagram of an embodiment of a method for determining a remediation action for a failure category.

Moving now to FIG. 6, a flow diagram is shown for an embodiment of a method for determining whether a remediation action is defined for a particular failure category. Method 600, like method 500 above, may be performed by computer system 100 of FIGS. 1 and 2 to determine a remediation action for a particular failure category. In some embodiments, a non-transitory, computer-readable medium has program instructions stored thereon that may be executable by computer system 100 to cause the operations described in regards to FIG. 6. Referring collectively to FIGS. 1 and 6, method 600 begins in block 601.

At block 610, method 600 includes determining, at a first point in time, that no remediation action has been defined for the particular failure category. As illustrated, failure remediation process 125, included in failure management program 102, accesses information associated with failure category 130c to determine if a particular remediation action has been assigned. At the first point in time, no remediation action has been assigned to failure category 130c.

Method 600 also includes, at block 620, failure management program 102 sending, by the failure management program, a notification that a remediation action has not been assigned to the particular failure category. In response to determining that no remediation action has been assigned to failure category 130c, failure remediation process 125 generates a message indicating that a remediation action has not been assigned failure category 130c. This message is sent to one or more system administrators and/or other entities associated with performance of batch process 150. In some embodiments, failure remediation process 125 may process other entries 120 that are assigned to other failure categories 130 to identify remediation actions for the other categories. In other embodiments, failure remediation process 125 may be active in determining a remediation action for failure category 130c by analyzing character strings associated with entries 120 assigned to failure category 130c to determine a particular cause for the assigned entries 120.

At block 630, method 600 further includes determining, at a second point in time, that the remediation action has been defined for the particular failure category. After remediation action 126 has been defined and assigned to failure category 130c, failure remediation process 125 determines that the assignment has been made. In some embodiments, the determination may include a status flag being set when the assignment of remediation action 126 is made. In other embodiments, the determination may include receiving an indication from a system administrator that remediation action 126 has been assigned to failure category 130c. In some embodiments, failure remediation process 125 may be active in defining remediation action 126, and therefore, the determination is included as part of assigning remediation action 126 to failure category 130c. Failure management program 102 may, in some embodiments, initiate a repeat performance of batch process 150 using remediation action 126. Method 600 ends in block 690. Method 600 may be repeated in response to other failure categories 130 not having remediation actions currently defined.

FIGS. 5 and 6 describe operations associated with assigning an entry to an existing failure category. In some cases, an entry in a failure log will not correspond to one of an existing set of failure categories. A method is described in regards to FIG. 7 that describes actions associated with identifying a new failure category.

Turning now to FIG. 7, a flow diagram is shown for an embodiment of a method for determining whether an entry included in a failure log corresponds to one of a set of failure categories. Method 700, like methods 500 and 600 above, may be performed by computer system 100 of FIGS. 1 and 2. In such embodiments, a non-transitory, computer-readable medium has program instructions stored thereon that may be executable by computer system 100 to cause the operations described in regards to FIG. 7. Referring collectively to FIGS. 2 and 7, method 700 begins in block 701.

At block 710, method 700 includes accessing, by failure management program 102 executing on computer system 100, failure log 110 that includes a plurality of character strings 122 corresponding to errors that are associated with execution of batch process 150. Batch process 150, while being performed on computer system 100, causes one or more errors to occur. A respective character string 122 is captured for each error and an identifier for an entry 120 and a corresponding character string 122 is stored in failure log 110. Failure classification process 105 determines whether a given one of entries 120 (e.g., entry 120c) corresponds to one of failure categories 130.

Method 700, at block 720, includes comparing, by failure management program 102, character string 122c of the plurality of character strings 122 to a set of character strings 133 that are associated with respective ones of a plurality of failure categories 130. The comparing includes determining whether particular keywords that are included in respective ones of the set of character strings 133 are included in character string 122c. Failure classification process 105 retrieves character string 122c from failure log 110 and compares it to character strings 133. As described previously, the comparison may include identifying particular keywords within character string 122c by eliminating commonly used words that do not provide much distinction. In some embodiments, correlation values, as described above, may be generated that indicate a degree of correlation between character string 122c and each of character strings 133.

At block 730, method 700 further includes, in response to character string 122c not corresponding to any of the set of character strings 133, performing, by failure management program 102, a similarity analysis of character string 122c to one or more ungrouped character strings 222 that do not correspond to any of the set of character strings 133. As illustrated, failure management program 102 calls similarity analysis process 235 in response to failing to identify a failure category 130 for entry 120c. Similarity analysis process 235 includes determining frequencies of occurrence for a plurality of keywords. For example, similarity analysis process 235 extracts keywords from character string 122c and from ungrouped character strings 222 by removing simple words (e.g., articles, conjunctions, etc.). Each of the keywords in character string 122c are compared to the keywords from ungrouped character strings 222 and a respective frequency of usage is determined for each keyword in character string 122c. An upper and a lower threshold may be utilized to identify a subset of ungrouped character strings 222 that are similar to character string 122c. The upper threshold may eliminate keywords that occur too frequently to provide distinction between the character strings 222. The lower threshold determines a minimum number of character strings that may form a subset. It is noted that techniques described above in regards to FIGS. 2 and 3 may also be utilized in block 730 to perform the similarity analysis.

Method 700, at block 740, also includes adding, by failure management program 102, new failure category 230d to the plurality of failure categories 130. In response to identifying a subset of ungrouped character strings 222 that include similar keywords as character string 122c, similarity analysis process 235 creates new failure category 230d and adds it to the set of failure categories 130. New failure category 230d includes an error corresponding to character string 122c, as well as other errors corresponding to the subset of ungrouped character strings 222. In addition, similarity analysis process 235 adds the similar keywords to character string 233d for use in identifying other entries 120 that may be assigned to new failure category 230d. Method 700 ends in block 790. In some embodiments, method 700 may be repeated for other entries included in failure log 110.

It is noted that method 700 is one example for identifying and adding a new failure category to an existing set of failure categories. Method 700 includes performing a similarity analysis between a particular character string and a group of ungrouped character strings. Method 800 in FIG. 8 depicts a method for performing a similarity analysis.

Figure 8:
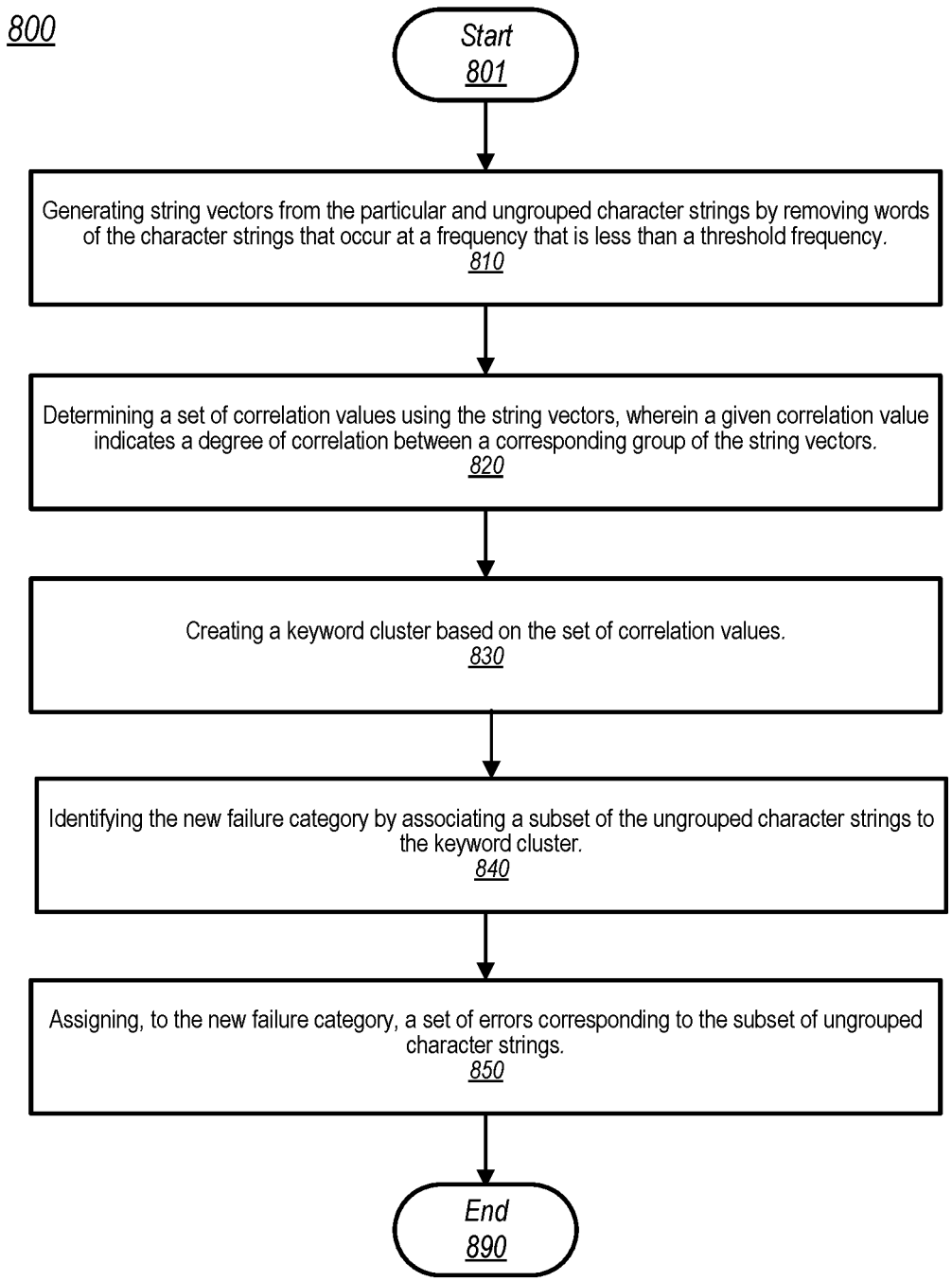
FIG. 8 shows a flow diagram of an embodiment of a method for performing a character analysis for comparing two or more character strings.

Proceeding now to FIG. 8, a flow diagram is shown for an embodiment of a method for performing a similarity analysis between a particular character string and a group of ungrouped character strings. Method 800, like the methods described above, may be performed by computer system 100 of FIGS. 1 and 2 by accessing a non-transitory, computer-readable medium that has program instructions stored thereon that may be executable by computer system 100 to cause the operations described in regards to FIG. 8. Referring collectively to FIGS. 2, 3, and 8, method 800 begins in block 801.

Method 800, at block 810, includes generating string vectors 360 from a particular character string (e.g., associated with entry 320a) and a group of ungrouped character strings (e.g., associated with entries 320b-320h) by removing words of the character strings 322 that occur at a frequency that is less than a threshold frequency. For example, failure management program 102 removes any words from the particular and the ungrouped character strings 322 that occur once or twice across all eight character strings 322. In addition, failure management program 102 may also remove simple words, such as articles or pronouns. In character analysis 370, a corresponding string vector 360 is generated for each entry 320.

At block 820, method 800 includes determining a set of correlation values 365 using string vectors 360, wherein a given correlation value 365 indicates a degree of correlation between a corresponding group of the string vectors 360. As illustrated, correlation values 365 may include a plurality of values for each entry 320. For example, failure management program 102 compares a string vector 360 for entry 320a to a string vector 360 for each of entries 320b-320h. Correlation values 365a may include seven values, one for each comparison to each of entries 320b-320h. In some embodiments, each correlation value is a numeric value, for example between '0' and '1' or between '1' and '100' or any suitable range of values that may be used to indicate a degree of correlation between two or more string vectors 360.

Method 800, at block 830, also includes creating keyword cluster 380 based on the set of correlation values 365. Failure management program 102 uses the set of correlation values 365 to identify a subset of entries 320 that satisfy a threshold degree of correlation with one another. For example, a subset that includes entries 320a, 320c, 320d, 320e, and 320h may have correlation values that indicate a medium to high level of correlation to one another. From this subset of five entries 320, keyword cluster 380 is generated by including keywords from the corresponding string vectors 360 that are found in, e.g., string vectors for two or more of the subset of entries 320. It is noted that the word "Error" is not included in keyword cluster 380. Since "Error" appears in all eight string vectors 360, and is not limited to the subset of entries 320, "Error" is removed due to not being distinctive to the subset.

At block 840, method 800 further includes identifying the new failure category by associating a subset of the ungrouped character strings to the keyword cluster. Failure management program 102 may compare character strings 322 for all ungrouped entries 320 to keyword cluster 380 to identify entries 320 that should be assigned to a new failure group. In other embodiments, failure management program 102 may limit the comparison to the entries included in the subset. A determination is made for each entry 320 whether the entry 320 belongs to a new failure category associated with the keyword cluster 380. Although the subset of entries is used to generate keyword cluster 380, repeating a comparison of the character strings 322 to keyword cluster 380 may improve an accuracy for classifying related entries 320.

Additionally, method 800 includes, at block 850, assigning, to the new failure category, a set of errors corresponding to the subset of ungrouped character strings 322. For each comparison to keyword cluster 380, failure management program 102 may determine another correlation value between a given entry 320 and keyword cluster 380. If this correlation value satisfies a threshold value, then an error associated with the given entry 320 is assigned to the new failure category. The method ends in block 890. In some embodiments, method 800 may be repeated as new entries 320 are captured in failure log 110.

It is noted that the methods of FIGS. 5-8 include multiple operations that are presented as occurring in a particular order. In various embodiments, the order may differ. In addition, various methods may be performed concurrently or as part of a different method. For example, method 800 may be performed as part of block 730 of method 700.

Figure 9:
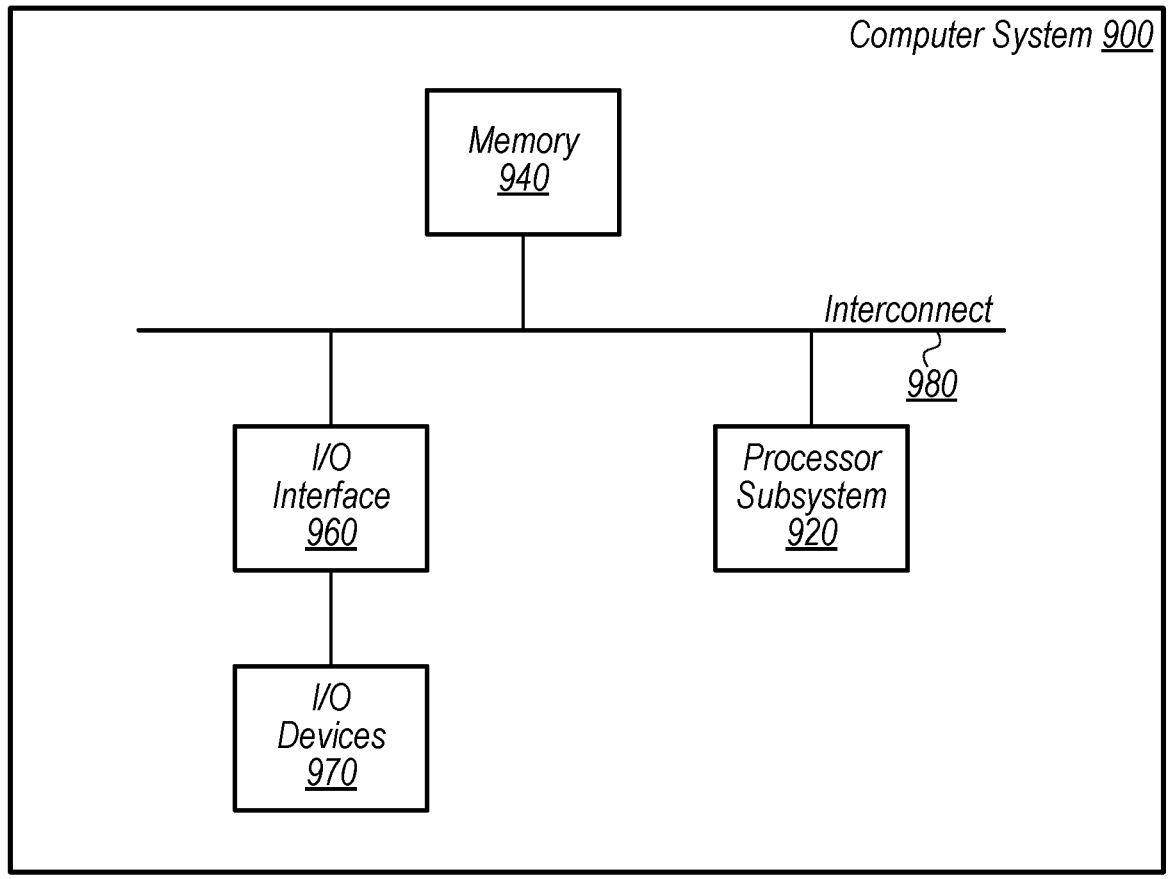
FIG. 9 is a block diagram illustrating an example computer system, according to some embodiments.

Referring now to FIG. 9, a block diagram of an example computer system 900 is depicted, which may implement one or more computing devices in a computer system, such as computer system 100 of FIGS. 1 and 2. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 to perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "devices," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "processes" operable to perform designated functions are shown in the figures and described in detail above (e.g., failure classification process 105, similarity analysis process 235, etc.). As used herein, the term "process" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A process may also be implemented in programmable hardware devices such as field programmable gate arrays, programmable array logic, programmable logic devices, or the like. A process may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    accessing, by a failure management program executing on a computer system, a failure log that includes a plurality of character strings corresponding to errors that are associated with execution of one or more batch processes;
    comparing, by the failure management program, a particular character string of the plurality of character strings to a set of character strings that are associated with respective ones of a plurality of failure categories, wherein the comparing includes determining whether particular keywords that are included in respective ones of the set of character strings are included in the particular character string, and determining that a particular error corresponding to the particular character string has a same job type as at least one other error that includes a keyword matching one of the particular keywords;

assigning, by the failure management program based on the comparing, the particular error to a particular failure category of the plurality of failure categories;

determining, by the failure management program, a remediation action corresponding to the particular error, wherein the remediation action is determined based on analyzing one or more errors associated with the particular failure category; and applying, by the failure management program, the remediation action to the particular error.

2. The method of claim 1, wherein comparing the particular character string to the set of character strings comprises determining a frequency of usage of the particular keywords in the particular character string.

3. The method of claim 1, further comprising determining, by the failure management program based on the comparing, that the particular error is associated with a same data source as at least some other error that correspond to the particular failure category.

4. The method of claim 1, further comprising determining, by the failure management program based on the comparing, that the particular error is associated with a same domain as at least some other errors that correspond to the particular failure category.

5. The method of claim 1, wherein determining the remediation action includes:
determining, at a first point in time, that no remediation action has been defined for the particular failure category;
sending, by the failure management program, a notification that a remediation action has not been assigned to the particular failure category; and
determining, at a second point in time, that the remediation action has been defined for the particular failure category.

6. The method of claim 1, wherein applying the remediation action to the particular error includes creating, by the failure management program, one or more child processes to perform tasks associated with the remediation action.

7. The method of claim 1, further comprising, in response to determining that the remediation action has completed, updating, by the failure management program, a respective state of the particular error.

8. A method, comprising:
accessing, by a failure management program executing on a computer system, a failure log that includes a plurality of character strings corresponding to errors that are associated with execution of one or more batch processes;
comparing, by the failure management program, a particular character string of the plurality of character strings to a set of character strings that are associated with respective ones of a plurality of failure categories, wherein comparing includes determining whether particular keywords that are included in respective ones of the set of character strings are included in the particular character string;
in response to the particular character string not corresponding to any of the set of character strings, performing, by the failure management program, a similarity analysis of the particular character string to one or more ungrouped character strings that do not correspond to any of the set of character strings, and wherein the similarity analysis includes determining frequencies of occurrence for a plurality of keywords and determining that an error corresponding to the particular character string is associated with a same domain as at least one other error that includes a matching character string; and adding, by the failure management program, a new failure category to the plurality of failure categories, wherein the new failure category includes a particular error corresponding to the particular character string.

9. The method of claim 8, further comprising generating, by the failure management program, a notification that the new failure category has been added.

10. The method of claim 8, wherein performing the similarity analysis includes generating string vectors from the particular and ungrouped character strings by identifying words of the character strings that occur at a frequency that is less than a threshold frequency.

11. The method of claim 10, wherein performing the similarity analysis further includes determining a set of correlation values using the string vectors, wherein a given correlation value indicates a degree of correlation between a corresponding group of the string vectors.

12. The method of claim 11, wherein comparing the particular character string to the one or more ungrouped character strings further includes:
creating a keyword cluster based on the set of correlation values;
identifying the new failure category by associating a subset of the ungrouped character strings to the keyword cluster; and
assigning, to the new failure category, a set of errors corresponding to the subset of ungrouped character strings.

13. The method of claim 8, wherein performing the similarity analysis includes determining that the particular error is associated with a same data source as at least some errors corresponding to a subset of the ungrouped character strings.

14. The method of claim 8, wherein performing the similarity analysis includes determining that the particular error has a same job type as at least some errors corresponding to a subset of the ungrouped character strings.

15. The method of claim 9, further comprising:
in response to the notification, analyzing errors added to the new failure category to determine a remediation action; and
applying the remediation action to the errors included in the new failure category.

16. A non-transitory computer-readable medium having instructions stored thereon that are executable by a computer system to perform failure management program by performing operations comprising:
accessing a failure log that includes a plurality of character strings corresponding to errors that are associated with execution of one or more batch processes;
identifying whether classified keywords, associated with a plurality of failure categories, are included in a particular character string of the plurality of character strings;
determining that a particular error corresponding to the particular character string is associated with a same domain as at least one other error that includes a matching classified keyword;

assigning, based on the determining, the particular error to a particular failure category of the plurality of failure categories;

determining a remediation action corresponding to the particular error, wherein the remediation action is determined based on analyzing one or more errors associated with the particular failure category; and applying the remediation action to the particular error.

17. The non-transitory computer-readable medium of claim 16, wherein determining the remediation action includes:

determining, at a first point in time, that no remediation action has been defined for the particular failure category;

sending a notification that a remediation action has not been assigned to the particular failure category; and determining, at a second point in time, that the remediation action has been defined for the particular failure category.

18. The non-transitory computer-readable medium of claim 16, wherein identifying whether the classified keywords are included in the particular character string includes determining frequencies of occurrence for the plurality of unclassified classified keywords in the particular character string.

19. The non-transitory computer-readable medium of claim 16, wherein applying the remediation action to the particular error includes creating, by the failure management program, one or more child processes to perform tasks associated with the remediation action.

20. The non-transitory computer-readable medium of claim 19, wherein the operations further comprise:

in response to determining that the remediation action has completed, updating, by the failure management program, a respective state of the particular error.

* * * * *